ELECTRIC LIGHT BULB WITH OSCILLATING FILAMENT

Original Filed Feb. 21, 1964

INVENTOR.
Robert J. Kyp.
BY James R. McKight
Attorney.

United States Patent Office

Re. 27,443
Reissued July 18, 1972

27,443

ELECTRIC LIGHT BULB WITH OSCILLATING FILAMENT

Robert J. Kyp, 526 Geneva Road,
Glen Ellyn, Ill. 60137

Original No. 3,237,053, dated Feb. 22, 1966, Ser. No. 346,481, Feb. 21, 1964. Application for reissue Jan. 29, 1971, Ser. No. 111,161
Int. Cl. H05b *41/16, 41/24*
U.S. Cl. 315—267 3 Claims

Matter enclosed in heavy brackets [ ] appears in the original patent but forms no part of this reissue specification; matter printed in italics indicates the additions made by reissue.

My invention relates to the combination of an electric light bulb having a filament with a magnet to move the filament into vibration to simulate the flickering of a flame of a candle.

It is among the objects of my invention to attach or associate a magnet within, to or with an electric light bulb having a filament, so as to oscillate the filament into vibration to simulate the flckering of a flame of a candle.

My invention also contemplates such other objects, advantages and capabilities as will later more fully appear, and which are inherently possessed by my invention.

While I have shown in the accompanying drawings a preferred embodiment of my invention, yet it is to be understood that the same is susceptible of modification and change without departing from the spirit of my invention.

Figure 1:
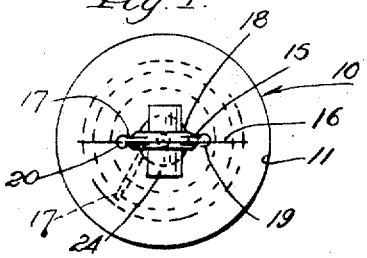
Figure 2:
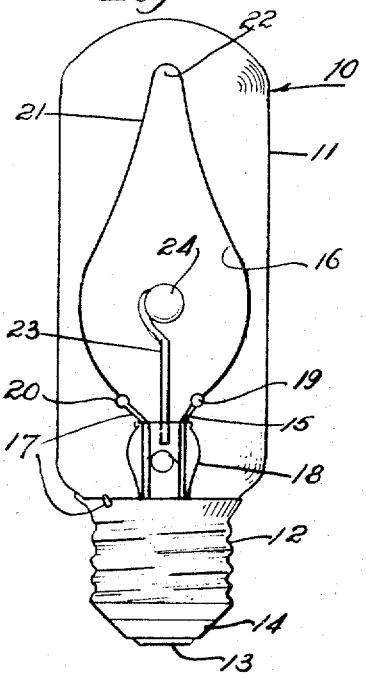
Figure 3:
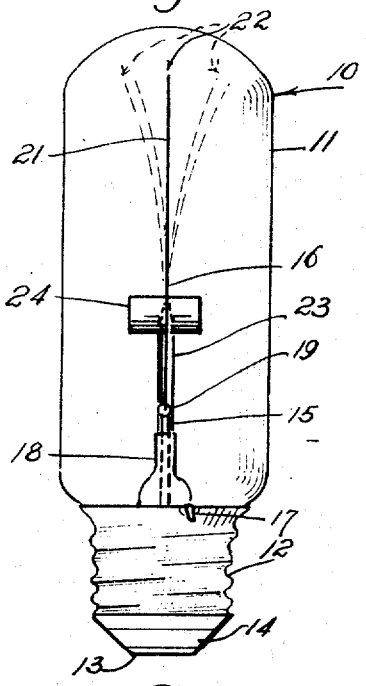
Figure 4:
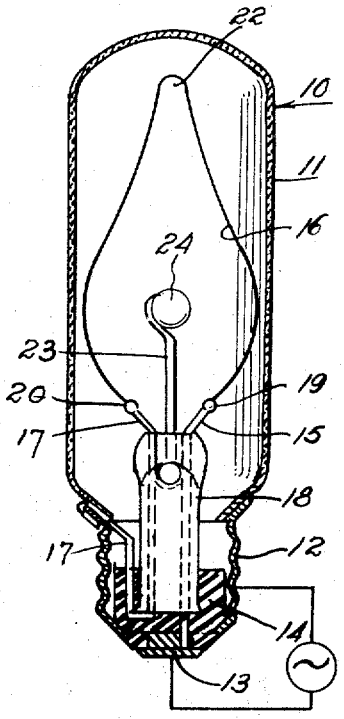
Figure 5:
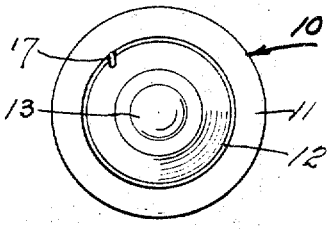
Figure 6:
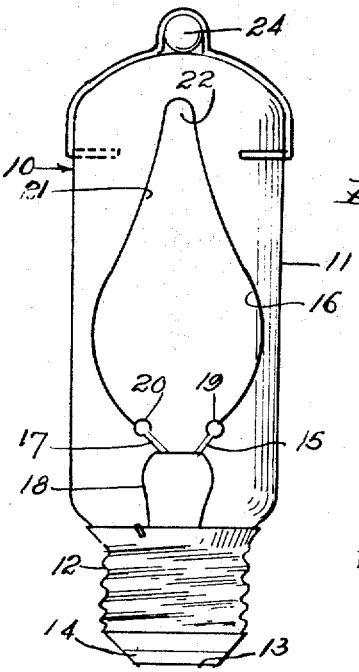

Referring to the drawings, FIG. 1 is a top plan view; FIGS. 2 and 3 are vertical elevational views at right angles to each other; FIG. 4 is a vertical sectional view; FIG. 5 is a bottom plan view of the preferred form of my electric light bulb with oscillating filaments; and FIG. 6 is a vertical elevational view of a modified form of my device.

The embodiment selected to illustrate my invention comprises an electric light bulb 10 having a closed transparent elongated glass body member 11 having at its lower portion a threaded part 12 spaced from a bottom electrical contact portion 13 by an insulated portion 14. Extending upwardly from said contact portion 13, within body member 11 is one leg 15 of filament 16. The other leg 17 of filament 16 extends to threaded part 12. Legs 15 and 17 of filament 16 are attached to glass stem press 18 supported on contact portion 13 and have enlarged extensions 19 and 20 therebeyond. An elongated loop portion 21 extends upwardly within body member 11 and connects extensions 19 and 20. Loop portion 21 converges to a curved upper end 22. Filament 16 is preferably made of carbon.

Positioned within loop 21 in body member 11, support pin 23 has its lower end mounted centrally into stem press 18. The upper end of support pin 23 is curved to support and is spot welded to cylindrical magnet 24, which is positioned at right angles to the axis of stem press 18.

In use when bulb 10 is screwed into an electric light socket leading to an electrical source of A.C. current, contact portion 13 receives electricity which is communicated to filament 16 to light up incandescent loop portion 21. Magnet 24 moves loop portion 21, and the electric current moves it back so that there is a continuing oscillating or vibrating of loop portion 21. This provides a moving lighted loop portion which simulates the flickering of a flame of a candle.

While I prefer as heretofore set forth to house my magnet 24 within the body portion 11 of the bulb 10, yet my magnet 24 may be attached to the exterior of the bulb, and if increased in magnetic power be positioned in sufficient proximity to the bulb to operate the filament and make it move.

*As shown in FIGS. 1–4 of the drawing, the filament 16 includes only a single loop 21, and this loop lies generally in a plane. Magnet 24 is a cylindrical magnet and is supported so that its major axis is generally normal to the plane of the loop and so that the magnet 24 is intersected by the plane of the loop 21. The single loop 21 is disposed so that all portions of the filament are spaced from the magnet 24 and the pin 23.*

Having thus described my invention, I claim:

[1. An electric light bulb having a filament as the only movable part, said filament adapted to be illuminated when said bulb is attached to a source of A.C. electrical current, said bulb having a stem mounted therein, a support pin mounted on said stem and a magnet attached to said support pin adjacent said filament to provide direct movement of the illuminated filament and with return movement set up by the A.C. electrical current to maintain continuing vibration of the illuminated filament simulating a flickering flame of a candle.]

*2. An electric light bulb having a filament as the only movable part, said filament adapted to be illuminated when said bulb is attached to a source of A.C. electrical current, said bulb having a stem mounted therein, a support pin mounted on said stem and a magnet attached to said support pin adjacent said filament to provide direct movement of the illuminated filament and with return movement set up by the A.C. electrical current to maintain continuing vibration of the illuminated filament simulating a flickering flame of a candle, said filament consisting essentially of a single loop with all portions thereof spaced from said magnet and said pin, at least a substantial portion of said filament lying generally in a plane, said magnet having a major axis disposed generally normal to said plane, and said plane intersecting said magnet.*

*3. The bulb of claim 2, said filament comprising a carbon filament.*

*4. The bulb of claim 2, said magnet being attached to said pin by a spot weld.*

References Cited

The following references, cited by the Examiner, are of record in the patented file of this patent or the original patent.

UNITED STATES PATENTS

| | | | |
|---|---|---|---|
| 251,548 | 12/1881 | Edison | 313—160 |
| 263,141 | 8/1882 | Edison | 313—160 X |
| 1,279,789 | 9/1918 | Tilley | 313—160 |
| 2,473,626 | 6/1949 | White | 313—160 |
| 2,602,886 | 7/1952 | Fields | 250—199 X |

FOREIGN PATENTS

| | | | |
|---|---|---|---|
| 368,913 | 12/1906 | France | 315—267 |
| 806,474 | 12/1958 | Great Britain. | |

NATHAN KAUFMAN, Primary Examiner

U.S. Cl. X.R.

313—153; 315—344